United States Patent
Deylitz et al.

(10) Patent No.: US 7,440,259 B1
(45) Date of Patent: Oct. 21, 2008

(54) CLOSURE DEVICE FOR A WITHDRAWABLE RACK

(75) Inventors: Erhard Deylitz, Berlin (DE); Burkhard Engemann, Berlin (DE); Stefan Losch, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 11/763,088

(22) Filed: Jun. 14, 2007

(51) Int. Cl.
*H02B 1/14* (2006.01)
*H02B 11/24* (2006.01)

(52) U.S. Cl. ............... 361/617; 361/605; 361/609; 361/615; 200/50.21; 200/50.22

(58) Field of Classification Search ......... 361/605–609, 361/615–617; 200/50.21–50.22
See application file for complete search history.

(56) References Cited

U.S. PATENT DOCUMENTS

| | | | | | |
|---|---|---|---|---|---|
| 2,340,082 | A | * | 1/1944 | Sauers | 361/607 |
| 4,285,026 | A | * | 8/1981 | Clausing | 361/617 |
| 4,565,908 | A | * | 1/1986 | Bould | 200/50.22 |
| 5,343,355 | A | * | 8/1994 | Ishikawa | 361/617 |
| 5,486,978 | A | * | 1/1996 | Fishovitz | 361/617 |

FOREIGN PATENT DOCUMENTS

| | | | |
|---|---|---|---|
| CH | 530100 | * | 12/1972 |
| DE | 3014557 A | * | 10/1981 |
| DE | 103 42 596 B3 | | 5/2005 |
| WO | WO 2005027288 A1 | * | 3/2005 |

* cited by examiner

*Primary Examiner*—Jayprakash N Gandhi
*Assistant Examiner*—Robert J Hoffberg
(74) *Attorney, Agent, or Firm*—Henry M. Feiereisen; Ursula B. Day

(57) ABSTRACT

A closure device for a withdrawable rack adapted for receiving power circuit breaker includes a plate arrangement having at least two plates provided with openings and movable relative to one another so that the plate arrangement is changeable between an open position in which the openings of the plates are in alignment and a closed position in which the openings are out of alignment. An actuating mechanism is acted upon by the power circuit breaker as it is inserted to cause a movement of at least one of the plates to thereby change the plate arrangement between the closed and open positions. The actuating mechanism includes two V-shaped linkage assemblies. Each linkage assembly has two legs connected by a hinge to allow the linkage assembly to spread apart, with one of the legs having a free end which is connected to the at least one of the plates, and a coupler is connected to the hinge. Both couplers are jointly articulated to actuating element.

10 Claims, 5 Drawing Sheets

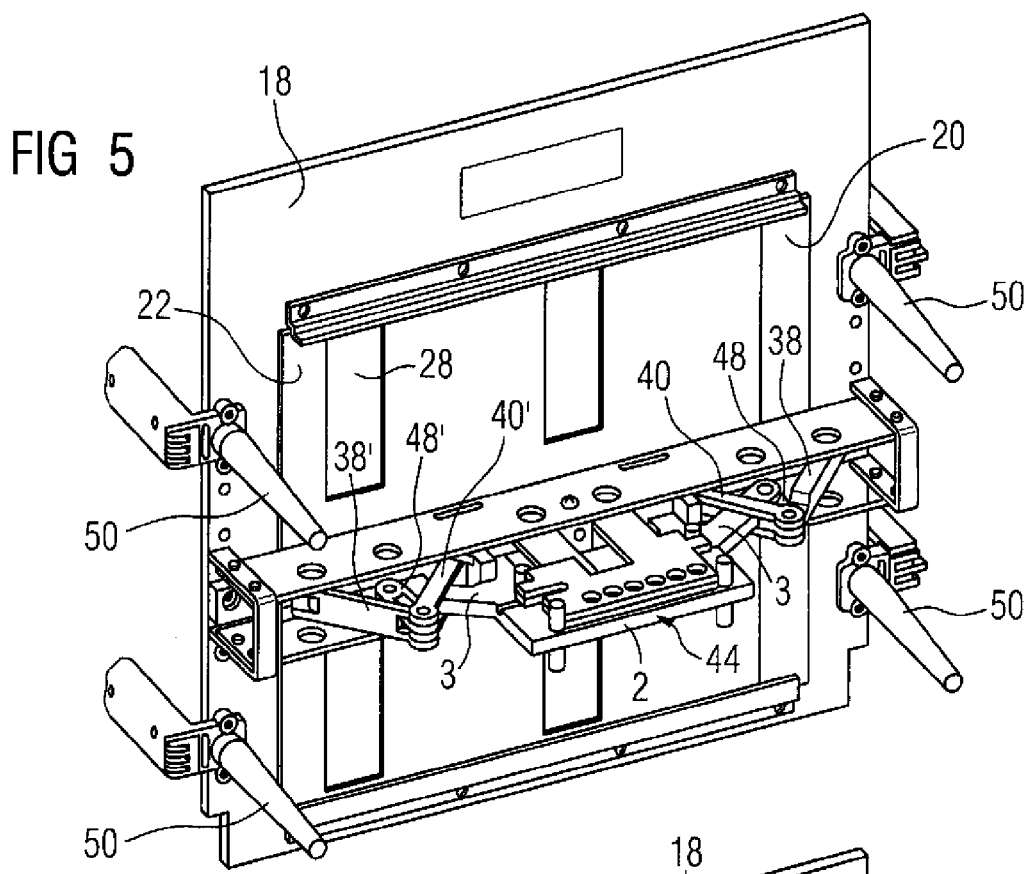
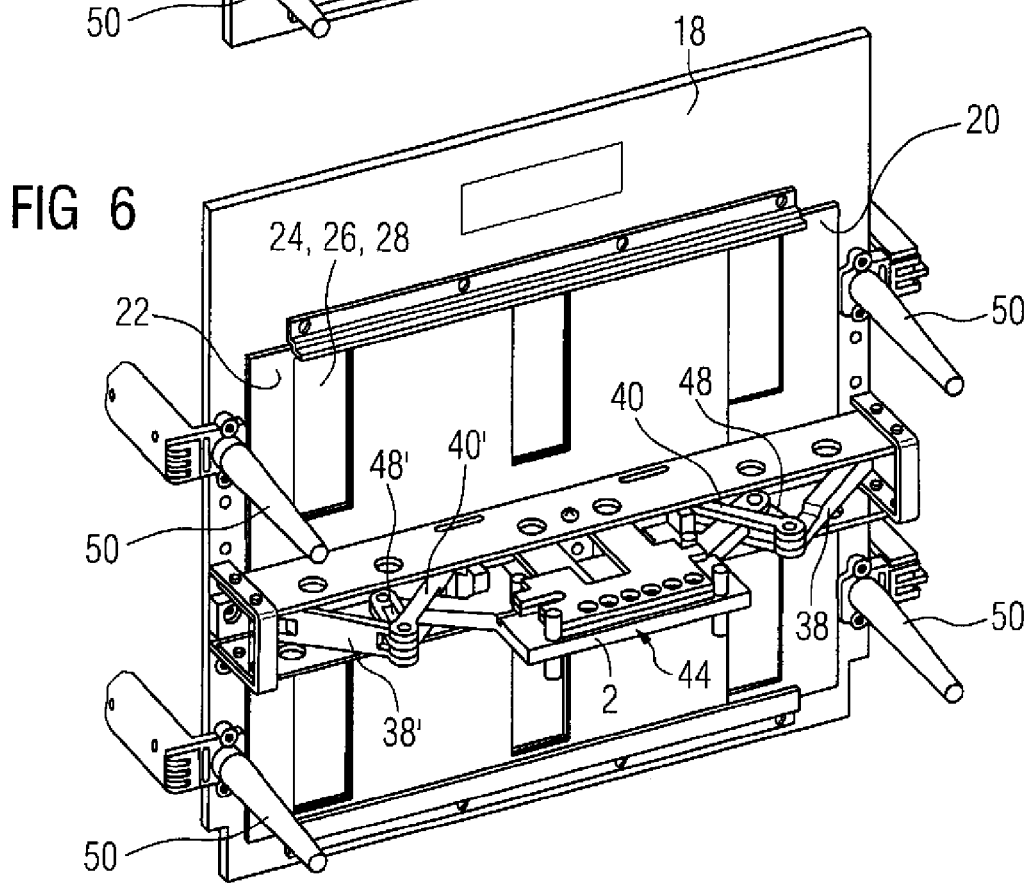

CLOSURE DEVICE FOR A WITHDRAWABLE RACK

BACKGROUND OF THE INVENTION

The present invention relates to a closure device for a withdrawable rack or module frame in which an electric switch, such as a power circuit breaker, can be inserted.

Nothing in the following discussion of the state of the art is to be construed as an admission of prior art.

In the following description, reference is made in general to "power circuit breaker" which should be understood in a generic sense to cover any type of electric switch for insertion into a withdrawable rack.

A closure device, which is also known as shutter, for a withdrawable rack is provided to prevent personnel in the vicinity of the withdrawable rack from accidentally touching exposed live contacts, such as contact blades located on the rear wall of the withdrawable rack, when the withdrawable rack is open, i.e., when a power circuit breaker is not inserted. Otherwise, personnel may receive a lethal electric shock when touching the exposed contacts. As protection from electric shock, two or more plates with openings are provided, wherein in a closed position of the closure device the openings of each plate are covered by at least one of the other plates, so that the plates effectively cover the contacts or contact blades. Conversely, when the closure device assumes an open position, the openings of the plates are in alignment and the entire plate arrangement can slide over the contact blades. Alignment of the openings can be realized by moving at least one plate with respect to the other plates, using a mechanism which is operated not by service personnel but by a power circuit breaker as it is inserted. Once the power circuit breaker is inserted, there is no risk for service personnel of touching the contact blades.

German Pat. No. DE 103 42 596 B3, published May 12, 2005, describes such a mechanism for a closure device. The mechanism includes two V-shaped linkage assemblies, wherein the legs of each linkage assembly are interconnected by a hinge for rotation. The hinge allows the linkage assembly to spread apart by increasing the angle between the legs. The free end of one of the legs of each linkage assembly is connected with a movable plate, whereas the other leg of each V-shaped linkage assembly is stationary. Ends of a telescoping bar with a variable length are attached to the corresponding hinges. The hinges move perpendicular to the insertion direction of the power circuit breaker, when the linkage assembly is spread apart, thereby increasing the distance between the hinges. This type of closure device suffers shortcomings because the telescoping bar must be extended during transition from a closed state to the open state and because during insertion the power circuit breaker applies pressure upon the telescoping bar as the telescoping bar telescopes out and moves perpendicular to the insertion direction of the power circuit breaker. As a consequence relatively high friction forces are generated which are further amplified by the substantial lever effect produced by the V-shaped linkage assembly.

It would therefore be desirable and advantageous to provide an improved closure device for a withdrawable rack, to obviate prior art shortcomings and to enable a low-friction operation.

SUMMARY OF THE INVENTION

According to one aspect of the invention, a closure device for a withdrawable rack adapted for receiving a power circuit breaker includes a plate arrangement having at least two plates provided with openings and movable relative to one another so that the plate arrangement is changeable between an open position in which the openings of the plates are in alignment and a closed position in which the openings are out of alignment, and an actuating mechanism acted upon by the power circuit breaker as it is inserted to cause a movement of at least one of the plates to thereby change the plate arrangement between the closed and open positions, said actuating mechanism comprising two V-shaped linkage assemblies, each linkage assembly having two legs connected by a hinge to allow the linkage assembly to spread apart, wherein one of the legs has a free end which is connected to the at least one of the plates, a coupler connected to the hinge, and an actuating element articulated to the coupler of one of the linkage assemblies and to the coupler of the other one of the linkage assemblies.

The present invention resolves prior art shortcomings by using a common actuating element which is articulated to the coupler of each linkage assembly so that a power circuit breaker, when inserted in a direction toward the plate arrangement, moves the actuating element to thereby spread the linkage assemblies apart and shift the plate arrangement accordingly. In other words, the distance between the hinges of the linkage assembly can be compensated in a mechanically simple manner in that the couplers operate as connecting links which are connected to both the linkage assembly and the actuating element. The actuating element therefore does not need to be flexible. Rather, the actuating element can be a rigid body and can even be formed, for example, as a single piece. The actuating element is then no longer subjected to forces applied in the direction perpendicular to the insertion direction of the power circuit breaker, thereby eliminating undesirable friction forces.

As mentioned above, the entire plate arrangement can slide over the contact blades of the withdrawable rack after the closure device attains its open position. As the power circuit breaker is inserted, the plates are moved relative to one another perpendicular to the insertion direction of the power circuit breaker, whereafter the plates move as a single unit in the insertion direction.

According to another feature of the present invention, the closure device can be constructed to mechanically prevent the actuating element from moving beyond the open position, after having reached the open position from the closed position. This prevents the actuating element from being subjected to additional forces from the power circuit breaker after the closure device attains the open position, which may otherwise cause damage to the actuating mechanism moving the plates. There are various ways for implementation. The actuating element may be suitably shaped, e.g. by providing support elements on the actuating element for support on one of the plates or a support device. As an alternative, the support elements can also be pointing away from the plate or the support device of the closure device. What is relevant is the fact that the actuating element can be supported in the open position of the closure device upon another element of the closure device, preferably an element which is not part of the actuating mechanism for moving the plates. For example the actuating element may be supported on a support structure that carries the entire plate arrangement of the closure device. The actuating element and the location where the actuating element is to be supported should have complementary configuration.

According to another feature of the present invention, a locking mechanism may be provided for locking the closed position of the plate arrangement, with the locking mechanism being constructed to simultaneously engage the actuating element and a structural component of the closure device separate from the actuating element. In this way, an operator is prevented from inadvertently pushing the actuating element by hand so as to open the closure device and unintentionally expose the contact blades and thus run the risk of an electric shock. The actuating element may have a plate-shaped configuration, with the locking mechanism including two locking plates disposed on the actuating element in side-by-side relationship or placed on top of each other. Suitably, the locking plates can be configured to slide easily on the actuating element in order to lock the actuating element and to interact with the structural component that is separate from the actuating element.

According to another feature of the present invention, each of the locking plates may have a hole, wherein the hole of one of the locking plates is in alignment with the hole of the other one of the locking plates in the closed position of the plate arrangement. The locking plates can then be locked in place, for example, by a padlock which prevents the locking plates from moving relative to the actuating element and the locked state from being released without first removing the padlock. In this way, unauthorized opening of the closure device is prevented, as possession of a key is required to open the padlock.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 is a side and front perspective view of the closure device according to the invention in the closed position;

FIG. 6 is a side and front perspective view of the closure device according to the invention in the open position;

DETAILED DESCRIPTION OF PREFERRED EMBODIMENTS

Figure 1:
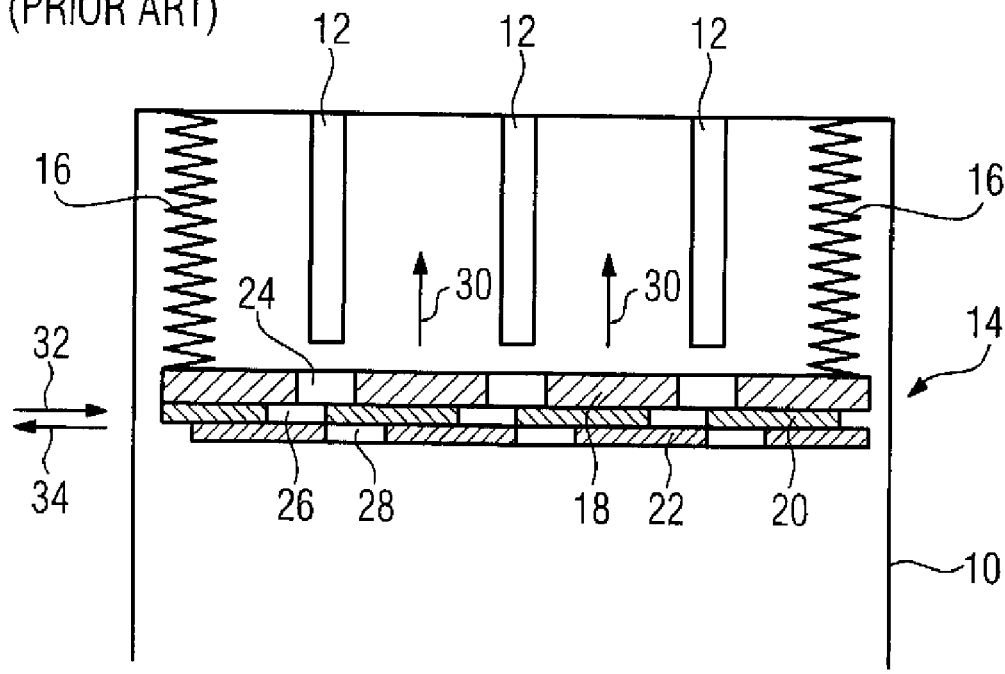
FIG. 1 shows schematically the basic operation of a withdrawable rack equipped with a closure device according to the present invention, with the closure device depicted in a closed position.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown schematically a withdrawable rack 10 intended for insertion of a power circuit breaker. The power circuit breaker is configured to receive electric energy via contact blades 12 which carry a high voltage. Therefore, the contact blades 12 should not be accessible from the open end of the withdrawable rack 10 in the absence of a power circuit breaker in the withdrawable rack 10. To this end, the withdrawable rack 10 is equipped with a closure device in the form of a plate arrangement 14 which is supported on the withdrawable rack 10 by springs 16. The plate arrangement 14 includes a comparably massive plate 18 which is referred to as a "mask plate" and is configured with spaced-apart openings 24, a first shutter plate 20 which is configured with spaced-apart openings 26, and a second shutter plate 22 which is configured with spaced-apart openings 28. FIG. 1 shows the plate arrangement 14 in a closed position in which the openings 24, 26, 28 are out of alignment so that the contact blades 12 become inaccessible from outside. Each of the openings 24, 26, 28 is thus covered by a solid portion of an adjacent plate. As a consequence, the plate arrangement 14 cannot be moved in a direction indicated by arrow 30 in opposition to the spring force of the spring 16 because the contact blades 12 are prevented from passing through the plate arrangement 14 in the depicted closed position.

Figure 2:
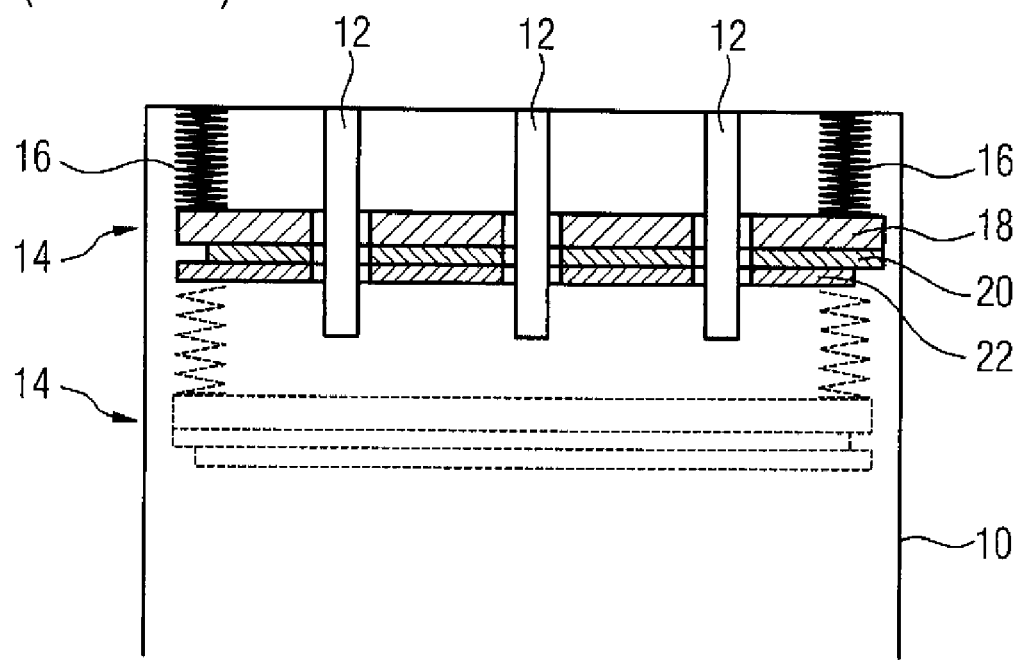
FIG. 2 is a schematic illustration of the closure device of FIG. 1 in an open position.

The first and second shutter plates 20, 22 are movable relative to the mask plate 18, as indicated in FIG. 1 by arrows 32, 34. By way of example, the first shutter plate 20 can move to the right, as indicated by arrow 32, whereas the second shutter plate 22 can move to the left, as indicated by arrow 34. In an end position depicted in FIG. 2, the openings 24, 26, 28 of the three plates 18, 20, 22 are precisely positioned in alignment, so that the contact blades 12 can now pass through the plate arrangement 14. This end position represents the open position of the closure device and is shown in FIG. 2. As a consequence, the plate arrangement 14 can be pushed rearwards in opposition to the spring force by a power circuit breaker from the initial position, as shown in broken lines in FIG. 2, thereby causing the contact blades 12 to emerge from the aligned openings 24, 26, 28 for connection to the power circuit breaker which thus receives electric energy from the contact blades 12.

Figure 3:
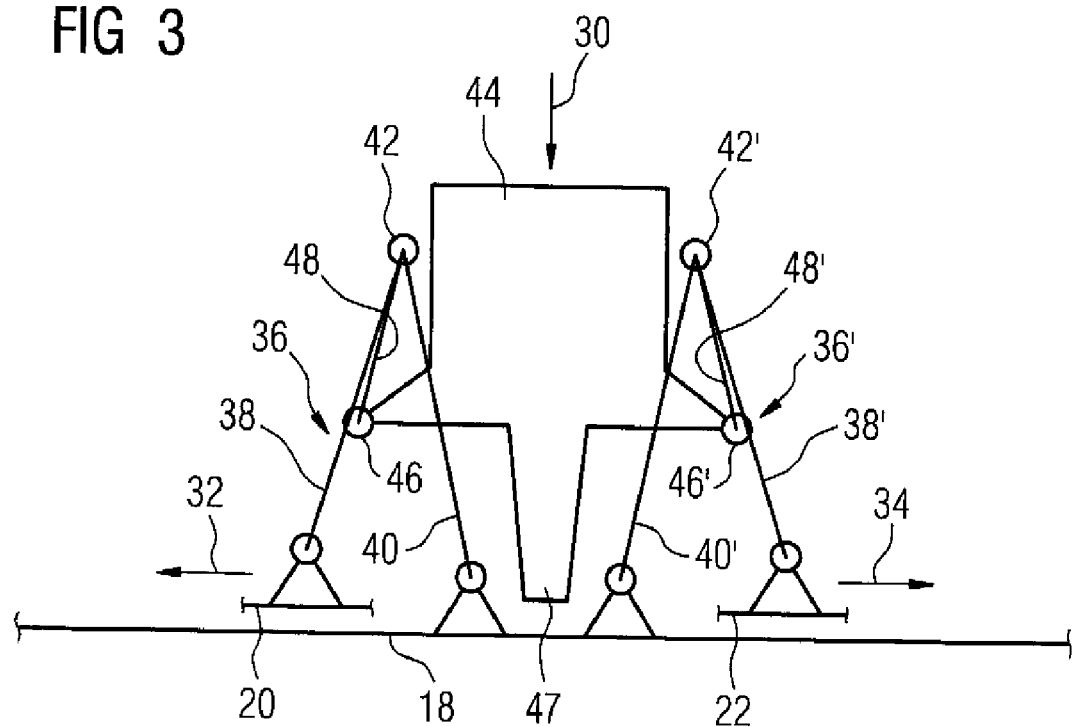
FIG. 3 shows schematically a principal illustration of an actuating mechanism of the closure device, with the closure device in the closed position.

Turning now to FIG. 3, there is shown a schematic illustration of an actuating mechanism to provide a lateral displacement of the shutter plates 20, 22 in the direction of arrows 32, 34. The actuating mechanism includes two linkage assemblies, generally designated by reference numbers 36, 36', for connection to the plate arrangement 14. Each linkage assembly 36, 36' has an outer leg 38, 38' and an inner leg 40, 40', with a hinge 42 connecting the outer leg 38 of the linkage assembly 36 with the inner leg 40 and allowing a relative movement between the outer leg 38 and the inner leg 40, and a hinge 42' connecting the outer leg 38' of the linkage assembly 36' with the inner leg 40' and allowing a relative movement between the outer leg 38' and the inner leg 40'. In the illustrated embodiment, the outer leg 38 is connected with the shutter plate 20, and the outer leg 38' is connected with the shutter plate 22, whereas the inner legs 40 and 40' provide support and are fixedly mounted to the mask plate 18 or a component fixedly connected to the mask plate 18.

Figure 4:
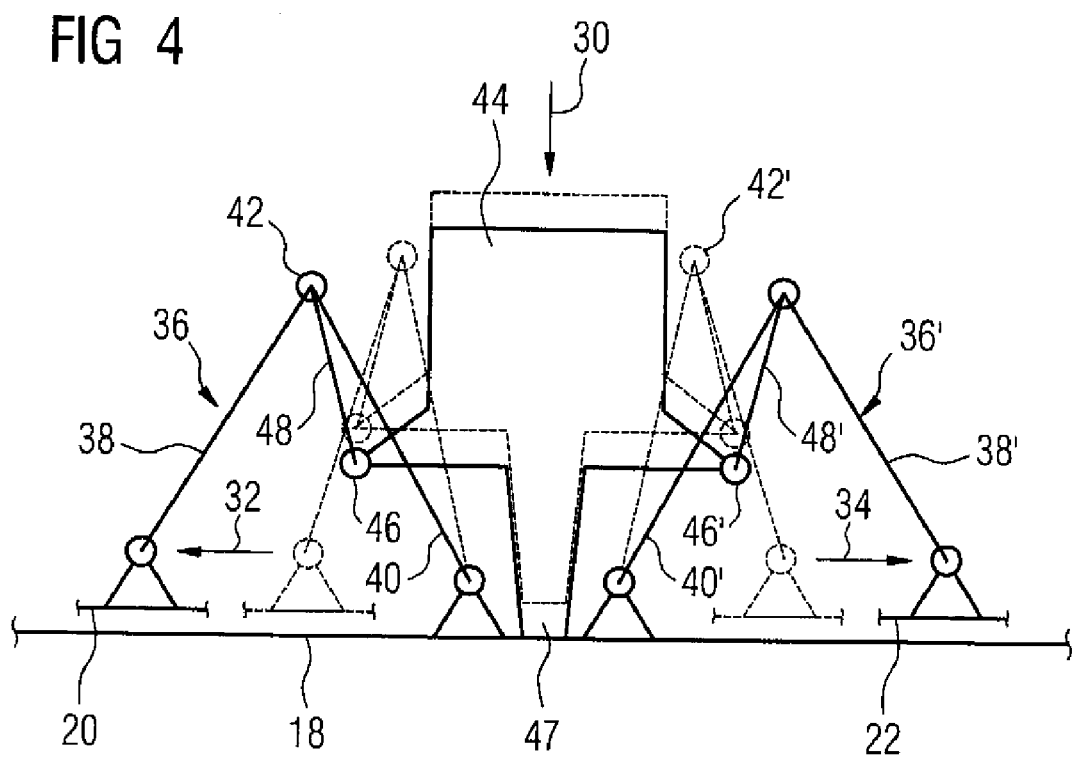
FIG. 4 shows schematically a principal illustration of the actuating mechanism for the closure device, with the closure device in the open position.
Figure 7:
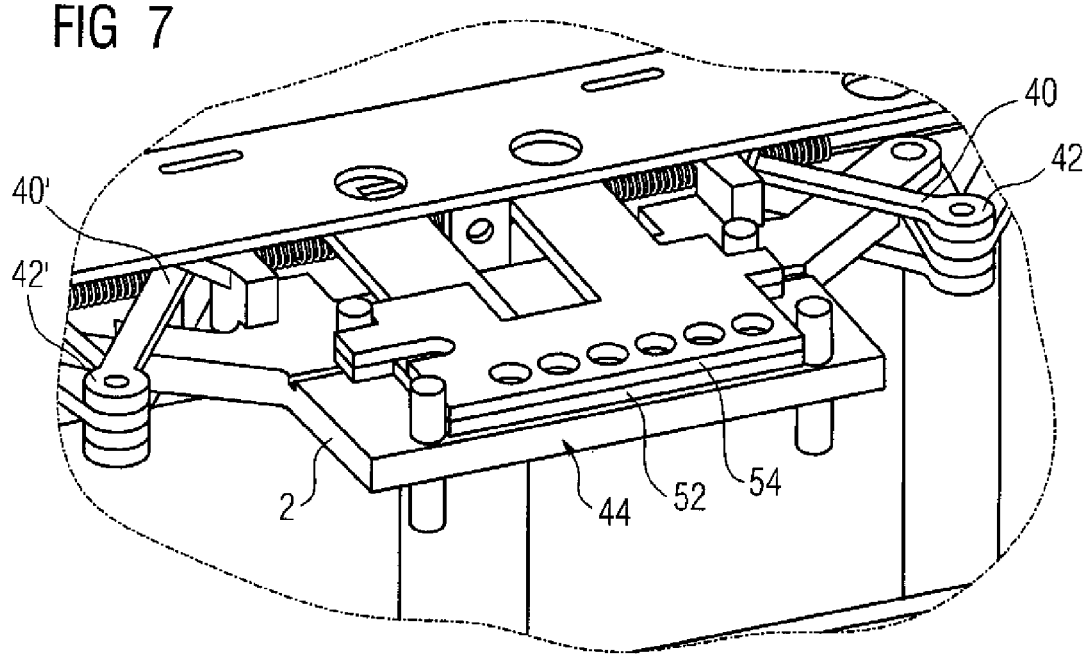
FIG. 7 is an enlarged detailed view of the actuating element in a closed position.

When the hinges 42, 42' are pushed in insertion direction of the power circuit breaker (not shown) in accordance with arrow 30, the V-shaped linkage assemblies 36, 36' are spread apart as the outer legs 38, 38' and also the shutter plates 20, 22 shift outwards, as indicated by arrows 32 and 34. The force applied on the hinges 42, 42' in order to push the linkage assemblies 36, 36' apart involves the provision of an actuating element 44 which has two hinges 46, 46'. A coupler 48 connects the hinge 46 of the actuating element 44 with the hinge 42 of the linkage assembly 36, and a coupler 48' connects the hinge 46' of the actuating element 44 with the hinge 42' of the linkage assembly 36'. When pressure is applied, e.g., by an inserted power circuit breaker upon the actuating element 44 in a direction indicated by the arrow 30, the hinges 42, 42' are drawn by the couplers 48, 48' in the same direction, causing a displacement of the shutter plates 20, 22 away from one another in the directions of arrows 32, 34, respectively. FIG. 4 illustrates the end position in which the shutter plates 20, 22 are shifted sufficiently to precisely align the openings 24, 26, 28. This represents the open position of the plate arrangement 14.

The actuating element 44 is formed with a projecting support member 47, which in the open position depicted in FIG. 4 contacts the mask plate 18 or a support element of the closing device in connection with the mask plate 18, to thereby prevent the actuating element 44 from continuing to move relative to the plate arrangement 14 in the direction of arrow 30. Once the open position with aligned openings 24, 26, 28 has been reached, the plate arrangement 14, including the two V-shaped linkage assemblies 36, 36' and the actuating element 44, can be moved in opposition to the force of springs 16 towards the contact blades 12 while the actuating mechanism 44 for shifting the plate arrangement 14 becomes no longer effective, i.e. the relative position of the plates 18, 20, 22 of the plate arrangement 14 remains unchanged.

An actual embodiment of the closure device, described in principle with reference to FIGS. 3 and 4, is shown in FIGS. 5 and 6. FIG. 5 illustrates hereby the closed position in accordance with FIGS. 1 and 3, whereas FIG. 6 illustrates the open position in accordance with FIGS. 2 and 4. Parts corresponding with those in FIGS. 1-4 are denoted by identical reference numerals and not explained again.

The actuating element 44 has a plate-shaped rectangular base body 2, with two bars 3 extending from the base 2 at an angle of about 45°. The couplers 48, 48' have a rod shaped configuration and are hingedly connected to the bars 3, respectively. In the closed position illustrated in FIG. 5, only the opening 28 of the second shutter plate 22 is visible from the front, because the other openings 24, 26 are rendered invisible by the second shutter plate 20. In the open position illustrated in FIG. 6, the three openings 24, 26 and 28 are in alignment, forming a rectangular window.

Four support rods 50 are secured to the mask plate 18 and have free ends which are located in a plane parallel to the mask plate 18, with the actuating element 44 projecting out of this plane. An unillustrated power circuit breaker having a flat rear wall thus first pushes the actuating element 44 to the rear during insertion so that the closure device can be moved to the open position shown in FIG. 6. Suitably, the rear wall of the power circuit breaker reaches the support rods 50 precisely when the open position shown in FIG. 6 is attained. Thereafter, a force is applied via the support rods 50 upon the entire closure device, which then moves over the contact blades 12 to reach the open position depicted in FIG. 2.

The closure device should always be in the closed position, shown in FIG. 5, when no power circuit breaker is accepted in the withdrawable rack 10. However, as it is still conceivable for a person to manually push the actuating element 44 rearwards so as to move the closure device to the open position and thus to expose the person to substantial risk of an electric shock, a locking mechanism is provided by which the closure device can be positively locked in the closed position when the withdrawable rack 10 is open, as will now be described in more detail with reference to FIGS. 7 to 10.

Figure 8:
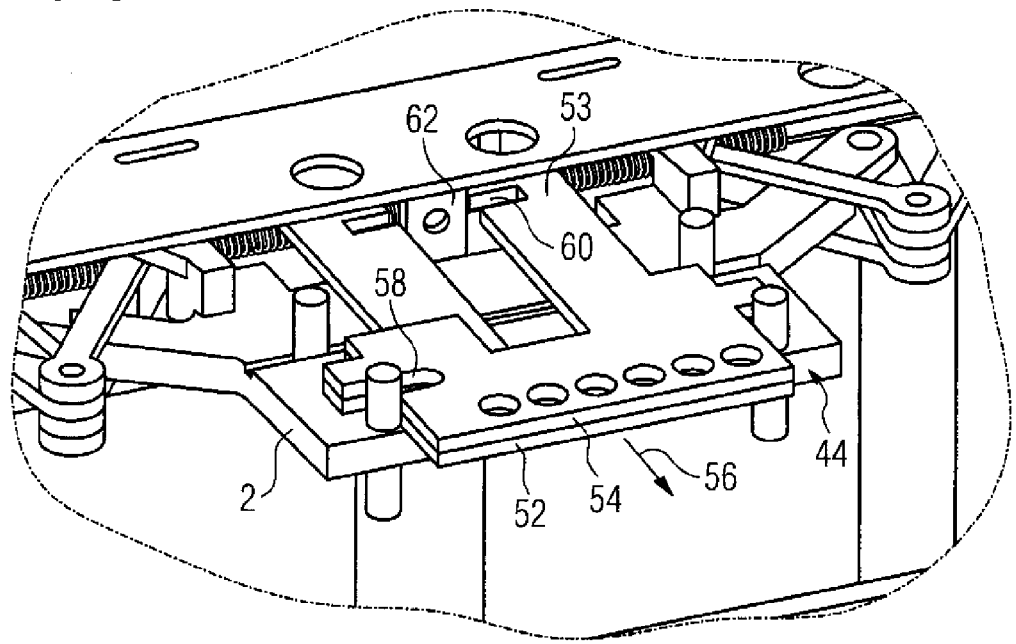
FIG. 8 is an enlarged detailed view of the actuating element in an open position.
Figure 9:
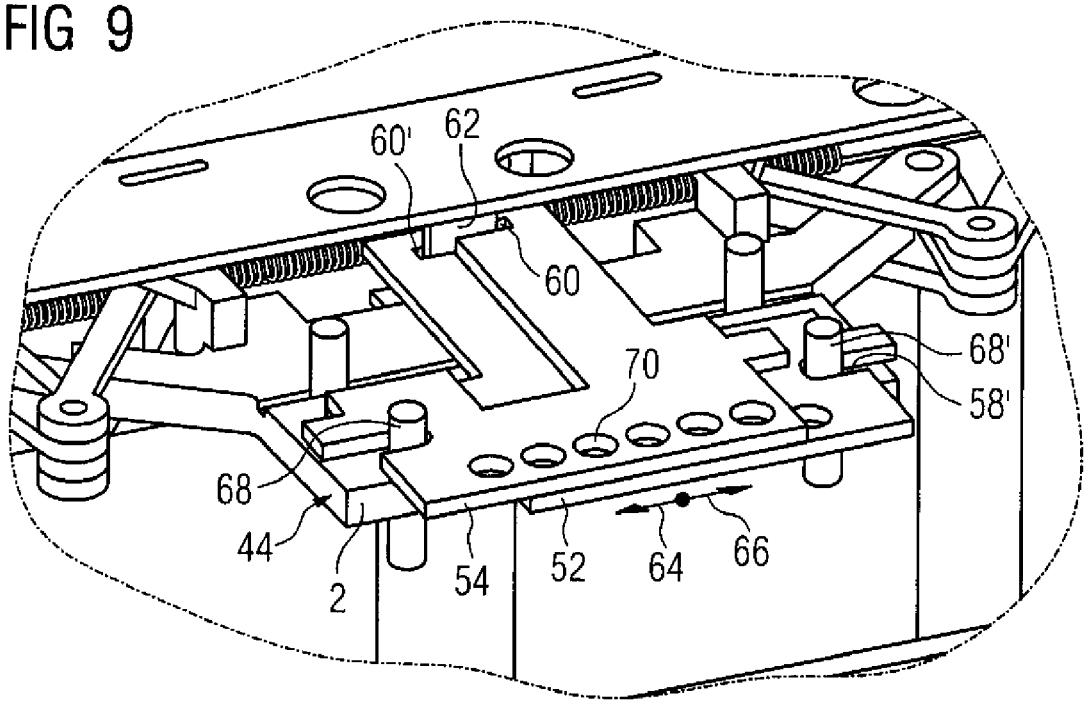
FIG. 9 is an enlarged detailed view of the actuating element in a locked position.

Two locking plates 52, 54 are arranged on the plate-shaped actuating element 44 and can freely move relative to the actuating element 44. A cover (not shown) can be provided to prevent removal of the locking plates 52, 54. To lock the closure device, both locking plates 52, 54 are initially pulled out in opposition to the insertion direction of the power circuit breaker, as indicated in FIG. 8 by arrow 56. As shown in FIG. 8 in particular, the locking plate 54 is formed with a first slot 58 in an area of the actuating element 44 and has a projection 53 which extends beyond the base body 2 and is formed with a second slot 60. In the pulled-out state depicted in FIG. 8, the slot 60 of the upper locking plate 54 is in precise alignment with an opposite bar 62 which is part of an otherwise unillustrated support unit of the closure device. The support unit is hereby stationarily connected with the mask plate 18 and thus a separate part of the actuating mechanism to move the shutter plates 20, 22. When the slot 60 of the locking plate 54 is aligned with the bar 62, the locking plates 52, 54 are moved in opposite directions, as indicated by arrows 64 and 66. This disposition is shown in FIG. 9. The slot 58 of the locking plate 54 embraces a pin 68 on the actuating element 44, whereas the slot 60 embraces the bar 62. Analogous to the locking plate 54, also the locking plate 52 is formed with a first slot 58' to embrace a pin 68' on the actuating element 44 and with a second slot 60' to embrace the bar 62 in opposition to the slot 60 of the locking plate 54. As a consequence, the actuating element 44 is rigidly connected with the bar 62 by the locking plates 52, 54 so that a relative motion of the actuating element 44 with respect to the mask plate 18 is no longer possible and the closure device is positively locked in closed position. The open position can only be attained after the lock is released.

Of course, the use of only one of the locking plates 52, 54 would be sufficient, although the use of two locking plates 52, 54 is currently preferred because is allows application of an additional safety measure. As shown in FIGS. 7 to 10, the locking plates 52, 54 have several holes 70 (e.g. bores). Only one hole 70 of the locking plate 52 is visible here. In the locked state as shown in FIG. 9, the locking plates 52, 54 are positioned relative to one another such that one hole 70 of the locking plate 54 is aligned with one hole 70 of the locking plate 52. Thus, a shackle 72 of a padlock 74 can be inserted through the aligned openings 70 to lock the padlock 74. As a consequence, the shackle 72 of the padlock 74 now prevents a relative movement between the locking plates 52, 54, i.e. movement in directions opposite to the arrows 64, 66. Unauthorized or inadvertent unlocking by a person is thus not easily possible. The padlock 74 can only be opened with a proper key, which should only be done to insert a power circuit breaker into the withdrawable rack 10.

Figure 10:
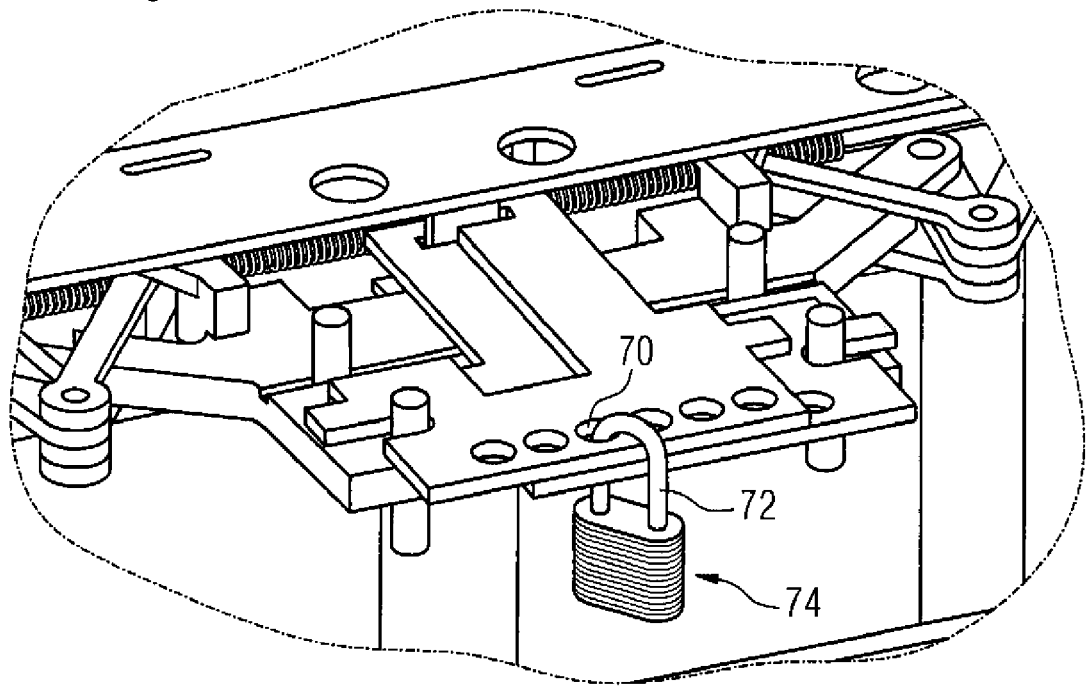
FIG. 10 is an enlarged detailed view of the actuating element in the locked closed position secured by a padlock.

Although the drawings show the locking plates 52, 54 with several holes 70, it is, of course, conceivable to provide each of the locking plates 52, 54 with one hole only, whereby the holes are positioned in such a way that the hole of the locking plate 52 is in alignment with the hole of the locking plate 54, when the closure device assumes the locked position, as shown in FIGS. 9 and 10.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A closure device for a withdrawable rack adapted for receiving a power circuit breaker, said closure device comprising:
   a plate arrangement including at least two plates having openings and movable relative to one another so that the plate arrangement is changeable between an open position in which the openings of the plates are in alignment and a closed position in which the openings are out of alignment; and
   an actuating mechanism acted upon by the power circuit breaker as it is inserted to cause a movement of at least one of the plates to thereby change the plate arrangement between the closed and open positions, said actuating mechanism comprising two V-shaped linkage assemblies, each linkage assembly having two legs connected by a hinge to allow the linkage assembly to spread apart, wherein one of the legs has a free end which is connected to the at least one of the plates, a coupler connected to the hinge, and an actuating element articulated to the coupler of one of the linkage assemblies and to the coupler of the other one of the linkage assemblies.

2. The closure device of claim 1, constructed to mechanically prevent the actuating element from moving beyond the open position, after having reached the open position from the closed position.

3. The closure device of claim 1, further comprising a locking mechanism for locking the closed position of the plate arrangement, said locking mechanism being constructed to simultaneously engage the actuating element and a structural component of the closure device separate from the actuating element.

4. The closure device of claim 3, wherein the actuating element has a plate-shaped configuration, said locking mechanism including two locking plates disposed on the actuating element.

5. The closure device of claim 4, wherein the locking plates are disposed on the actuating element in side-by-side relationship.

6. The closure device of claim 4, wherein the locking plates are disposed on the actuating element placed on top of another.

7. The closure device of claim 4, wherein each of the locking plates has a hole, wherein the hole of one of the locking plates is in alignment with the hole of the other one of the locking plates in the closed position of the plate arrangement.

8. The closure device of claim 7, further comprising a padlock for attachment to the aligned openings of the locking plates.

9. A withdrawable rack, comprising a closure device according to claim 1.

10. A switchboard comprising a withdrawable rack according to claim 9.

* * * * *